(12) United States Patent
Finkler et al.

(10) Patent No.: US 8,497,764 B2
(45) Date of Patent: Jul. 30, 2013

(54) POSITION TRANSMITTER SYSTEM

(75) Inventors: Roland Finkler, Erlangen (DE);
Stephan Fretzschner, München (DE);
Markus Knorr, Augsburg (DE);
Joachim Scharnagl, Fürth (DE); Georg Schlatterer, Zahling (DE)

(73) Assignee: Siemens Aktiengesellschaft, Munich (DE)

( * ) Notice: Subject to any disclaimer, the term of this patent is extended or adjusted under 35 U.S.C. 154(b) by 505 days.

(21) Appl. No.: 12/880,788

(22) Filed: Sep. 13, 2010

(65) Prior Publication Data

US 2011/0221570 A1 Sep. 15, 2011

(30) Foreign Application Priority Data

Sep. 14, 2009 (DE) .......................... 10 2009 041 483

(51) Int. Cl.
*H04Q 5/22* (2006.01)
(52) U.S. Cl.
USPC .................... 340/10.1; 310/12.01; 310/12.19; 138/135
(58) Field of Classification Search
USPC .................... 340/10.1, 1.1; 310/12.01, 12.05, 310/12.19, 135; 318/135
See application file for complete search history.

(56) References Cited

U.S. PATENT DOCUMENTS

| | | | |
|---|---|---|---|
| 7,999,535 B2 | 8/2011 | Dietz et al. |
| 2006/0092034 A1 | 5/2006 | Tarlton |
| 2007/0131418 A1 | 6/2007 | Barrett |
| 2008/0164830 A1 | 7/2008 | Jajtic et al. |
| 2008/0272926 A1 | 11/2008 | Ma |
| 2011/0234376 A1 | 9/2011 | Deichmeyer et al. |

FOREIGN PATENT DOCUMENTS

| | | |
|---|---|---|
| DE | 10 2005 017 498 A1 | 10/2006 |
| DE | 102005045374 A1 | 4/2007 |
| DE | 102008039377 A1 | 2/2010 |

*Primary Examiner* — Brian Zimmerman
*Assistant Examiner* — Sara Samson
(74) *Attorney, Agent, or Firm* — Henry M. Feiereisen LLC

(57) ABSTRACT

A measurement system for finding the position of a primary part of a linear motor with respect to a secondary part includes an absolute value measurement system for recording a first reference position of the primary part with respect to the secondary part, and an incremental measurement system for recording a fine position of the secondary part relative to the first reference position recorded by the absolute measurement system. The absolute value measurement system includes at least one RFID reader and at least one first RFID tag which is identifiable by the RFID reader, with the first RFID tag intended to identify the first reference position.

18 Claims, 2 Drawing Sheets

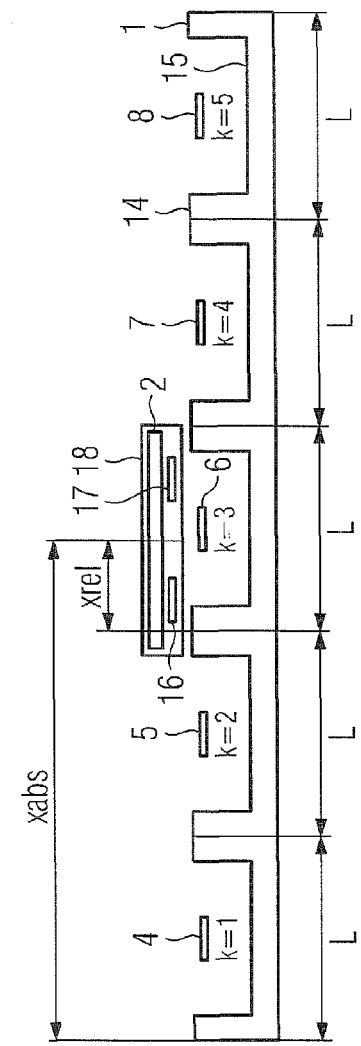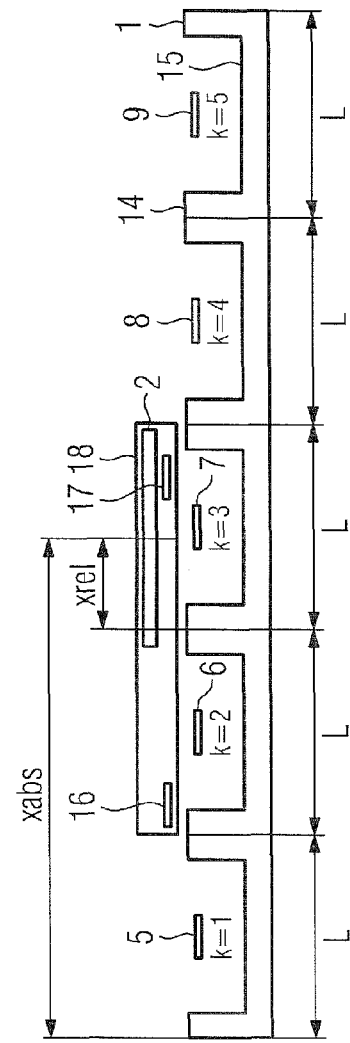

POSITION TRANSMITTER SYSTEM

CROSS-REFERENCES TO RELATED APPLICATIONS

This application claims the priority of German Patent Application, Serial No. 10 2009 041 483.5, filed Sep. 14, 2009, pursuant to 35 U.S.C. 119(a)-(d), the content(s) of which is/are incorporated herein by reference in its entirety as if fully set forth herein.

BACKGROUND OF THE INVENTION

The present invention relates to a measurement system and method for finding a position along a linear trackway. More particularly, the present invention relates to a measurement system and method for finding a position of a primary part of a linear motor with respect to a secondary part of the linear motor.

The following discussion of related art is provided to assist the reader in understanding the advantages of the invention, and is not to be construed as an admission that this related art is prior art to this invention.

For controlled operation of a three-phase synchronous linear motor, it is necessary to record the instantaneous commutation angle. The commutation angle is required in order to split the total current level required to develop a specific desired force correctly between the three phase currents. Furthermore, very exact position control is frequently required for linear motors. This is the case, for example, with machine tool drives. In applications such as these, the position signal is correspondingly also required to determine the current position of the primary part of the linear motor with respect to the secondary part of the linear motor.

German patent document DE 10 2005 017 498 A1 discloses a synchronous linear motor with contactless scanning of the tooth structure of a secondary part. The tooth structure of the secondary part, which has no permanent magnets and is in the form of a toothed rod, is designed to be position-dependent in the movement direction. The synchronous linear motor is equipped with an absolute position measurement system and with an incremental position measurement system, in such a way that the coarse resolution of the absolute measurement system is complemented by the fine resolution of the incremental measurement system.

To ensure clarity, in the following description a reference to a movement or position change in the context of the linear motor relates to a relative movement of some type between the primary part and the secondary part of the linear motor. This also applies for a movement of the primary part over the secondary part, or vice versa.

It would be desirable and advantageous to provide an improved measurement system which obviates prior art shortcomings and which is robust and in particular insensitive to dirt, for position finding.

SUMMARY OF THE INVENTION

According to one aspect of the present invention, a measurement system for finding a position of a primary part of a linear motor with respect to a secondary part of the linear motor, includes an absolute value measurement system for recording a first reference position of the primary part with respect to the secondary part, said absolute value measurement system including at least one RFID reader and at least one first RFID tag which is identifiable by the RFID reader, said first RFID tag being provided to identify the first reference position, and an incremental measurement system for recording a fine position of the secondary part relative to the first reference position recorded by the absolute measurement system.

According to another aspect of the present invention, a method for finding the position of a primary part of a linear motor with respect to a secondary part of the linear motor, includes the steps of recording a first reference position of the primary part with respect to the secondary part using an absolute value measurement system, and recording a fine position of the secondary part relative to the first reference position, recorded by the absolute value measurement system, using an incremental measurement system, wherein the first reference position is recorded by using an RFID reader of the absolute value measurement system to record a first RFID tag, which identifies the first reference position, of the absolute value measurement system.

In accordance with the invention, the absolute value measurement system is used to determine the first reference position of the primary part with respect to the secondary part. In order to allow this, the absolute value measurement system includes the at least one RFID reader, by means of which the first RFID tag can be read, when the primary part is sufficiently close. The RFID reader therefore provides the information at the moment when the first RFID tag is recorded that its scanning head is currently located (approximately) above the first RFID tag. The first reference position is therefore a type of coarse position information. After the first RFID tag has been recorded, the measurement system has the information that the primary part is located somewhere in the recording area of the first RFID tag. The precise position of the primary part with respect to the secondary part is, however, defined only by logically linking this coarse position information with the fine position which is recorded by the incremental measurement system. The fine position therefore represents information which defines the coarse position information more precisely.

By way of example, the first reference position is determined only when the linear motor is being accelerated. In some circumstances, this is expedient, since the first reference position can be updated only on a relatively slow clock cycle, with the aid of the RFID measurement system and the associated logic. Suitably, the one reference position is determined not only once after acceleration using the absolute value measurement system but also after this, using a correspondingly slower clock cycle. This allows a plausibility check to be carried out in which the fine position recording carried out with the aid of the incremental measurement system is compared with the reference position recorded using the slower clock cycle.

After the first reference position has been recorded, the incremental measurement system records the fine position with respect to the previously determined first reference position. The fine position is preferably recorded by means of the incremental measurement system using a fixed clock cycle. In this case, this may be the current regulator clock cycle of the superordinate drive system. In the case of conventional current regulators, a position change is therefore evaluated and a fine position determined using a clock frequency of several kilohertz.

In the measurement system according to the invention, the absolute position is determined in a first step in the form of the first reference position, by means of the RFID system. "Onward counting" then takes place, with the aid of the incremental measurement system.

According to another advantageous feature of the present invention, the measurement system may includes at least one second RFID tag for identifying a second reference position. The second RFID tag is arranged offset from the movement direction with respect to the first RFID tag. When the linear motor is moving, the position signal is in this way "updated" for the measurement system. This makes it possible to correct incremental errors. Depending on the extent of the linear motor, it is, of course, also possible to use further RFID tags to identify further reference positions.

According to another advantageous feature of the present invention, when using two or more RFID tags, the measurement system may include a processing unit to compare the second reference position with a position of the primary part which has previously been determined and a distance travelled since the determination of the position until recording the second RFID tag, with the distance being recorded by the incremental measurement system. In this way, a plausibility check can be executed. The processing unit can hereby be configured to check whether the position changes counted up by the incremental measurement system during a movement of the linear motor, from the previously determined position to the second reference position, actually correspond to the distance between these positions.

A measurement system according to the invention can be integrated in a linear motor with a primary part and a secondary part, in order to allow exact position control of the linear motor. The first RFID tag can hereby be arranged on the secondary part, and the at least one RFID reader can be arranged on the primary part. Advantageous fine position recording with the aid of the incremental measurement system is made possible in a particularly simple manner when configuring the secondary part with a plurality of essentially structurally identical secondary part segments which are arranged in a row, wherein each secondary part segment has a periodic structure in the movement direction. The segmented structure of the secondary part allows a user to configure his linear motor on a modular, application-specific basis. Depending on the required movement length, the user can attach secondary part segments to one another corresponding to the required movement length.

According to another advantageous feature of the present invention, the incremental measurement system may include a measurement head arranged on the primary part to determine the fine position by recording the periodic structure. The periodic structure is also partly responsible for the force developed by the motor by use of the magnetic moment or reluctance moment. No additional measurement standard is therefore required on the secondary part.

According to another advantageous feature of the present invention, the secondary part can be constructed in the absence of a permanent magnet, with the periodic structure is in the form of a tooth structure with teeth and slots in alternating relationship in the movement direction. In this way, it possible to use a scanning head based on the reluctance resolver principle or the functional principle of a toothed wheel transmitter.

As an alternative, the periodic structure may also be formed by permanent magnets which are separated from one another and are arranged in a row in the movement direction. In this way, the secondary part can be read, for example by means of an arrangement of Hall elements, for an incremental measurement.

According to another advantageous feature of the present invention, the reference position can be determined very easily by each secondary part segment having at least one RFID tag in which a data item which identifies the secondary part segment is stored. If information is now also available which assigns the secondary part segments to a position within the linear motor, then the respective reference position can be derived very easily from the data item.

It is to be understood by persons skilled in the art that that some RFID readers can not only identify RFID tags but can also determine the approximate distance between the reader and the identified tag in particular by evaluation of the reception field strength. Although determination of distance in this way does not meet stringent accuracy requirements for position control, it can still be used as an additional information source for a plausibility check in order to check the fine position produced by the incremental measurement system. A plausibility check such as this should be carried out, in particular, using a clock cycle that is slower than that for the incremental measurement.

According to another advantageous feature of the present invention, the measurement system may have at least one second RFID tag for identifying a second reference position, wherein the first and second RFID tags are numbered along the movement direction, with the number of each of the first and second RFID tags being stored in its memory. In this way, an absolute value measurement can be implemented just as easily. The RFID tags can be arranged at equal distances on the secondary part. The numbering makes it possible to deduce the respective reference position of an RFID tag that has been read.

Oftentimes, customers of a linear motor demand a very high level of flexibility for the configuration of their application. A modular design of the linear motor in the form of individual secondary part segments arranged in a row is hereby instrumental in order to achieve this flexibility. This flexibility can be further enhanced in accordance with another advantageous feature of the present invention, whereby the measurement system, having at least one second RFID tag for identifying a second reference position, may have an RFID writer to write the first and second RFID tags with a data item which identifies an associated reference position. one advantageous refinement of the invention. This embodiment has the advantage that the sequence of the secondary part segments can still be defined by the end user. When the secondary part segments are delivered, the data item which identifies them has not yet been written to the RFID tags. The end user does not write the data item which identifies the associated reference position to the RFID tags until the secondary part segments have been arranged in a row for his application. In this case, for example, RFID tags can be numbered in a rising or falling sequence in the movement direction.

A reference position can advantageously be determined at virtually any position of the linear motor, if the RFID reader can record at least one RFID tag in every position which can be assumed by the primary part during normal operation of the linear motor. If one and only one RFID tag is identified, then the reference position corresponds to the reference position which identifies said RFID tag. If, in contrast, two RFID tags are identified, then the fine position recorded by the incremental measurement system is used to decide which of the reference positions identified by the two RFID tags is valid.

It is very simple to embody the RFID measurement system such that at least one RFID tag can be recorded at any time, by placing an appropriately large number of RFID tags at an appropriately short distance from one another on the secondary part. In general, a capability to continuously record at least one reference position along the movement path of the motor can advantageously ensure that at least one RFID tag is associated with one period, irrespective of the configuration of the periodic structure. If an information item stored in the RFID tag in this case uniquely identifies the corresponding period, a reference position can be determined immediately after switch-on, in any position of the motor. As the period length increases, it may also in this case be worthwhile arranging more than one RFID tag per period.

When there is a toothed structure in the secondary part, at least one RFID tag can be advantageously arranged in each tooth gap. However, depending on the tooth pitch, i.e. the distance between the teeth, there may be a situation in which an RFID tag cannot be detected in each position, if one and only one RFID tag is placed in each slot. Particularly in a configuration such as this, it may be advantageous when the RFID reader has two read heads which are offset with respect to one another in the movement direction such that at least one of the read heads can record at least one RFID tag in each position which can be assumed by the primary part during normal operation of the linear motor. In some circumstances, a minimum distance should be maintained between the two read heads. Therefore, according to another advantageous feature of the present invention, the read heads may be arranged offset with respect to one another orthogonally with respect to the air-gap direction and the movement direction. In addition or as an alternative, the minimum distance between the read heads can be provided by separating the read heads from one another in the movement direction such that the distance between the first and the second RFID tag is less than the distance between the read heads.

In accordance with the present invention, the RFID reader is assured to record at least one RFID tag in every position which can be assumed by the primary part during normal operation of the linear motor, there is no need to carry out movements after switch-on in order to determine a first reference position. The linear motor is ready to operate immediately after it has been switched on.

BRIEF DESCRIPTION OF THE DRAWING

Other features and advantages of the present invention will be more readily apparent upon reading the following description of currently preferred exemplified embodiments of the invention with reference to the accompanying drawing, in which.

FIG. 3 shows a schematic illustration of yet another embodiment of a measurement system for position finding in accordance with the present invention, with one RFID tag per slot, and one RFID reader with two read heads; and FIG. 4 shows a schematic illustration of still another embodiment of a measurement system for position finding in accordance with the present invention, with one RFID tag per slot, and one RFID reader with two read heads which are separated at a grater distance from one another, compared to the embodiment of FIG. 3.

DETAILED DESCRIPTION OF PREFERRED EMBODIMENTS

Figure 1:
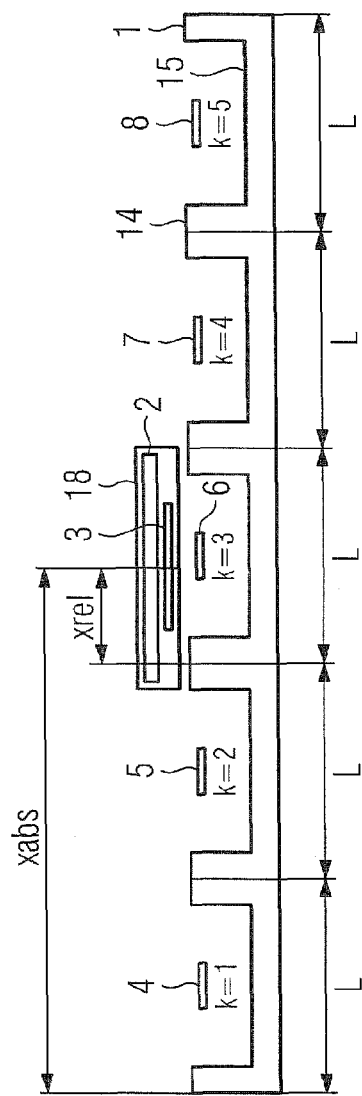
FIG. 1 shows a schematic illustration of one embodiment of a measurement system for position finding in accordance with the present invention, with one RFID tag per slot.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of one embodiment of a measurement system for position finding in accordance with the present invention, with one RFID tag 4, ..., 8 per slot 15. The measurement system is arranged on a linear motor having a secondary part 1 and a primary part, which is not illustrated in the drawing. The secondary part 1 is in the form of a structure which is periodic in the movement direction, wherein this periodic structure can be characterized as a tooth structure with teeth 14 and slots 15 arranged alternately in the movement direction. The primary part, which is not illustrated here, correspondingly comprises both permanent magnets for producing an excitation field and coils through which current can be passed in order to produce an alternating field.

One RFID tag 4, ..., 8 is located in each slot 15. Each of these RFID tags 4, ..., 8 characterizes a reference position which the primary part assumes with respect to the secondary part 1.

A scanning head 18 is arranged on the primary part, comprising an RFID reader 3 and an incremental measurement system 2. The RFID reader 3 identifies at least one of the RFID tags 4, ..., 8 in every position which the primary part can assume with respect to the secondary part 1 during normal operation.

The incremental measurement system 2 operates on the reluctance resolver principle. It comprises two sensors which are arranged offset through about one quarter of the tooth pitch L and produce two symmetrical signals, similar to a sine wave, phase-shifted through 90° on evaluation of the magnetic reluctance, which is predetermined by the tooth structure of the secondary part 1. The relative fine position with respect to the reference position can be determined by means of a system such as this.

Accurate position finding is now possible by a combination of the reference position recorded by means of the RFID system and the fine position determined with the aid of the incremental measurement system 2. The illustrated RFID system is in this case designed such that the RFID reader 3 identifies either one and only one of the RFID tags 4, ..., 8 or two and only two immediately successive RFID tags 4, ..., 8 depending on the position of the primary part with respect to the secondary part 1. The exact position xabs of the primary part can now be determined as a function of the tooth pitch L and of the relative position xrel with respect to a tooth center using the following relationships, where xrel in this case represents a variable which is equivalent to the fine position of the secondary part relative to the reference position. It is just determined by a different reference point, specifically the center of a tooth 14, and therefore differs from the fine position relative to the recorded reference position only by an offset. It is obvious that any desired reference point within the linear motor can be chosen for the fine position and correspondingly also for xrel, in order to implement the idea according to the invention.

The absolute position xabs determined by the measurement system is therefore a function of whether one and only one RFID tag 4, ..., 8 or two RFID tags 4, ..., 8 is or are determined. The following formula relationship is now based on the assumption that the RFID tags 4, ..., 8 are numbered successively. A first RFID tag 4 is numbered k=1. A second RFID tag 5 is numbered k=2. A third RFID tag 6 is numbered k=3. A fourth RFID tag 7 is numbered k=4 and, correspondingly, a fifth RFID tag 8 is numbered k =5. In this situation where one and only one RFID tag 4, . . . , 8 with the number k is now identified, the absolute position xabs is given by the following relationship.

$$xabs=(k-1)L+xrel$$

If, in contrast, the tags with the numbers k and k+1, and only these tags, are identified, where xrel<L2, then.

$$xabs=(k \cdot L)+xrel$$

If, in contrast, the tags k and k+1 are likewise identified, where xrel is greater than or equal to L2, then the absolute position is calculated using the following relationship.

$$xabs=(k-1)L+xrel$$

The following two options can be used to determine the number k.
1. A serial number of the RFID tags 4, . . . , 8 is read and reference is then made to a table, which is stored in a memory of the measurement system, to determine the value of the associated k.
2. After the serial number has been read, a suitable data item stored in the RFID tag 4, . . . , 8 can then be read, which already contains the value of k.

Furthermore, the following plausibility checks P1, . . . , P3 are implemented in the illustrated measurement system.
P1. for the case in which the incremental measurement system 2 finds that the scanning head 18 is located approximately centrally over a tooth 14 and, nevertheless, one and only one tag is identified, an error message or a warning is output. This is because, in this case, the RFID reader 3 would have to identify two tags, one to the left of the scanning head 18 and one to the right of the scanning head 18.
P2. for the case in which the scanning head 18 is located approximately centrally above a tooth gap 15 and, nevertheless, two RFID tags 4, . . . , 18 are identified, an error message or warning is likewise output. This is because, in this case, the RFID reader 3 would have to identify one, and only one RFID tag 4, . . . , 8.
P3. for the case in which no RFID tag 4, . . . , 8, more than two RFID tags 4, . . . , 8 or two RFID tags 4, . . . , 8 which are not directly successive are identified, an error message or warning is output.

In a modification to the measurement system described above, the RFID system comprising the RFID reader 3 and the RFID tags 4, . . . , 8 can also be designed such that the RFID reader 3 identifies either no RFID tag or one and only one RFID tag 4, . . . , 8, depending on the position. In this case, the absolute position xabs is obtained on identification of the tag k using the following formula relationship.

$$xabs=(k-1)L+xrel$$

A system such as this has the disadvantage in comparison to the previously described RFID system, in which at least one RFID tag 4, . . . , 8 is identified in each position, that no RFID tag 4, . . . , 8 will be identified in certain positions when the linear motor is switched on, and that no reference position will therefore be directly available. This can be overcome by moving the scanning head 18 through a certain fraction of the period length L and then restarting the attempt to determine the reference position. In this case, a considerable advantage is still achieved in comparison to a conventional measurement system which comprises only an incremental measurement system 2 and in which the scanning head 18 may need to be moved through several meters in order to reach a reference point. This is because, in contrast to such a system known from the prior art, it is generally necessary, for example, to move through only a few millimeters from a tooth separation of 50 mm, in order to determine the reference point.

The previously described plausibility checks P1, . . . , P3 can also be implemented analogously in a system such as this.

For the sake of completeness, a further refinement of the RFID system should also be known, in which the RFID reader 3 identifies either an odd number 2n−1 of immediately successive RFID tags 4, . . . , 8, or an even number 2n of immediately successive RFID tags 4, . . . , 8, depending on the position (n=2, 3 . . . ).

In this case, the absolute position xabs can be determined as follows.

In the case where the tags (k−n+1) to (k+n−1) are identified, then.

$$xabs=(k-1) \cdot L+xrel$$

For the case in which only the tags (k−n+1) to (k+n) are identified and xrel<L/2, then.

$$xabs=k \cdot L+xrel$$

while, if xrel is greater than or equal to L/2, then.

$$xabs=(k-1)L+xrel.$$

The plausibility checks P1, . . . , P4 can also be implemented in an analogous manner here.

Figure 2:
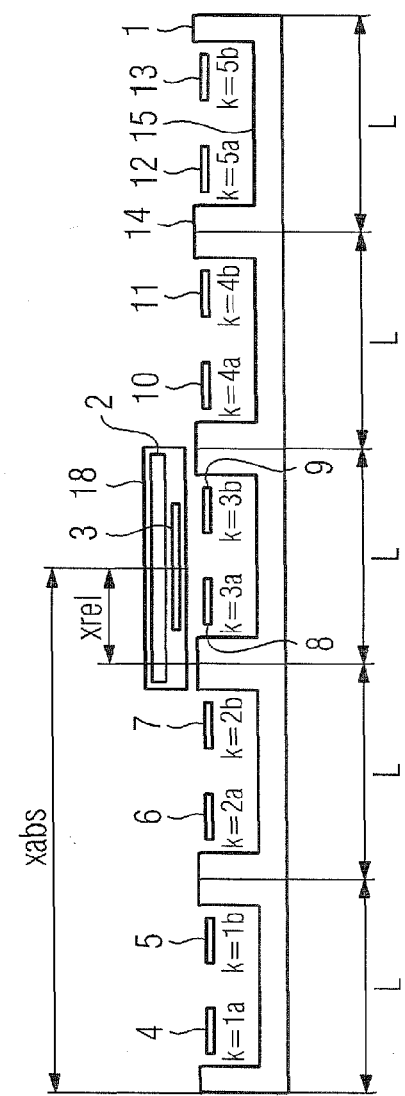
FIG. 2 shows a schematic illustration of another embodiment of a measurement system for position finding in accordance with the present invention, with two RFID tags per slot.

FIGS. 2 to 4 show further exemplary embodiments of the measurement system. Elements having the same function are in this case provided with the same reference signs as those already used in FIG. 1.

FIG. 2 shows a measurement system for position finding according to one refinement of the invention with two RFID tags 4, . . . , 13 in each slot 15. This measurement system represents a possible way to still allow the reference position to be identified in every position of the primary part with respect to the secondary part 2 by means of an RFID system which, in the arrangement illustrated in FIG. 1, would in some cases not identify any RFID tag 4, . . . , 13, depending on the position. The use of two or more RFID tags 4, . . . , 13 in each slot 15, instead of only one in each case, makes it possible for the RFID reader 3 to identify at least one RFID tag 4, . . . , 13 in all cases, because the distance between the RFID tags 4, . . . , 13 is now shorter.

FIG. 3 shows a measurement system for position finding according to one refinement of the invention with one RFID tag 4, . . . , 8 in each slot 15, and with an RFID reader with two read heads 16, 17. A system such as this can also provide a remedy for the situation in which the movement which might be necessary in the case of the arrangement illustrated in FIG. 1 if only one or no RFID tag 4, . . . , 8 were identified, depending on the position, would create a disturbance. The use of two read heads 16, 17, which are arranged offset with respect to one another in the movement direction, instead of only a single read head makes it possible to ensure that at least one of the read heads 16, 17 will always identify an RFID tag 4, . . . , 8.

In order to allow the correct reference position to be found, it is necessary, in some circumstances, for there to be a minimum distance between the two read heads 16, 17. If this distance cannot be achieved solely by offsetting the RFID read heads 16, 17 in the movement direction of the linear motor, then the RFID read heads 16, 17 can also be arranged offset with respect to one another at right angles to the plane of the drawing, that is to say orthogonally with respect to the movement direction and with respect to the air-gap direction of the linear motor.

A further remedy is provided by the measurement system illustrated in FIG. 4. FIG. 4 shows a measurement system for position finding according to one refinement of the invention with one RFID tag 4, ..., 9 in each slot 15, and with one RFID reader with two read heads 16, 17, which are separated further from one another than in the refinement shown in FIG. 3. In comparison to the RFID system shown in FIG. 3, the left-hand read head 16 is in this case offset by one secondary subperiod to the left, with a first RFID tag 4 also being added at the extreme left. This is located outside the secondary part 1. In this way, the RFID reader still identifies a tag further to the left of the tag at the left-hand boundary in FIG. 3. Apart from this, the RFID measurement system operates completely analogously to that shown in FIG. 3.

At this point, it should also be noted that, in some applications, the absolute position of the primary part with respect to the secondary part may not be required over the entire movement length, but only in a number of subareas thereof. In these applications, there is then no need for every secondary part segment to contain an RFID tag 4, ..., 13. In this case, it is sufficient to provide RFID tags 4, ..., 13 only for those for which this is necessary for reliable absolute position identification in said subareas. In most applications, the linear motor is operated on a speed-controlled basis. In this case, the drive receives a nominal speed as an input variable, which is in turn produced by a superordinate system (for example a PLC or numerical control system) in which, for example, position control is implemented. In this case, the incremental position information xrel from the incremental measurement system 2 is frequently sufficient for the drive, while the absolute position xabs and the information from the RFID reader 3 are required only in said superordinate system.

Reference position identification by means of RFIDs is extremely robust and, for example, is considerably less sensitive to dirt than reference position identification based on barcodes. The electromagnetic interference sensitivity of the RFID system can be reduced by also using components, in particular ferrite mats, arranged on the secondary part in addition to the tags, which, although they advantageously influence the RFID field, as far as possible have no adverse influence on the motor function, however. The intermediate spaces between the tags and the functional components of the secondary part can preferably also be filled with potting compound. These two last-mentioned measures are not illustrated in the drawings.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A measurement system for finding a position of a primary part of a linear motor with respect to a secondary part of the linear motor, said measurement system comprising.
   an absolute value measurement system for recording a first reference position of the primary part with respect to the secondary part, said absolute value measurement system including at least one RFID reader and at least one first RFID tag which is identifiable by the RFID reader, said first RFID tag being provided to identify the first reference position; and
   an incremental measurement system for recording a fine position of the secondary part relative to the first reference position recorded by the absolute measurement system.

2. The measurement system of claim 1, further comprising at least one second RFID tag for identifying a second reference position.

3. The measurement system of claim 2, further comprising a processing unit to compare the second reference position with a position of the primary part which has previously been determined and a distance travelled since the determination of the position until recording the second RFID tag, with the distance being recorded by the incremental measurement system.

4. A linear motor, comprising.
   a primary part and a secondary part movable in relation to one another in a movement direction; and
   a measurement system for finding a position of the primary part with respect to a secondary part, said measurement system including an absolute value measurement system for recording a first reference position of the primary part with respect to the secondary part, said absolute value measurement system including at least one RFID reader and at least one first RFID tag which is identifiable by the RFID reader, said first RFID tag being provided to identify the first reference position, and an incremental measurement system for recording a fine position of the secondary part relative to the first reference position recorded by the absolute measurement system.

5. The linear motor of claim 4, wherein the first RFID tag is arranged on the secondary part, and the at least one RFID reader is arranged on the primary part.

6. The linear motor of claim 5, wherein the secondary part comprises a plurality of essentially structurally identical secondary part segments which are arranged in a row, wherein each secondary part segment has a periodic structure in the movement direction.

7. The linear motor of claim 6, wherein the incremental measurement system includes a measurement head arranged on the primary part to determine the fine position by recording the periodic structure.

8. The linear motor of claim 6, wherein the secondary part is constructed in the absence of a permanent magnet, and wherein the periodic structure is configured in the form of a tooth structure with teeth and slots in alternating relationship in the movement direction.

9. The linear motor of claim 6, wherein the periodic structure is formed by permanent magnets which are separated from one another and arranged in a row in the movement direction.

10. The linear motor of claim 6, wherein each secondary part segment has at least one said RFID tag in which a data item which identifies the secondary part segment is stored.

11. The linear motor of claim 4, wherein the measurement system has at least one second RFID tag for identifying a second reference position, wherein the first and second RFID tags are numbered along the movement direction, with the number of each of the first and second RFID tags being stored in its memory.

12. The linear motor of claim 4, wherein the measurement system has at least one second RFID tag for identifying a second reference position, and an RFID writer to write the first and second RFID tags with a data item which identifies an associated reference position.

13. The linear motor of claim 4, wherein the measurement system has at least one second RFID tag for identifying a second reference position, and an RFID writer to record at least one of the first and second RFID tags in each position which can be assumed by the primary part during normal operation of the linear motor.

14. The linear motor of claim 13, wherein the RFID reader has two read heads arranged offset with respect to one another in the movement direction such that at least one of the read heads records at least one of the first and second RFID tag in each position which can be assumed by the primary part during normal operation of the linear motor.

15. The linear motor of claim 14, wherein the read heads are arranged offset with respect to one another orthogonally with respect to an air-gap direction and the movement direction.

16. The linear motor of claim 14, wherein the read heads are separated from one another in the movement direction such that a distance between the first and the second RFID tags is less than a distance between the read heads.

17. A method for finding the position of a primary part of a linear motor with respect to a secondary part of the linear motor, said method comprising the steps of:
  recording a first reference position of the primary part with respect to the secondary part using an absolute value measurement system; and
  recording a fine position of the secondary part relative to the first reference position, recorded by the absolute value measurement system, using an incremental measurement system,
  wherein the first reference position is recorded by using an RFID reader of the absolute value measurement system to record a first RFID tag, which identifies the first reference position, of the absolute value measurement system.

18. The method of claim 17, wherein the RFID reader records a second RFID tag to identify a second reference position, and the second reference position is compared with a position which results from the first reference position and the fine position.

* * * * *